Feb. 1, 1938.   L. C. POWELL   2,106,987
DISTORTION CHECK FOR WELDING APPARATUS
Filed Dec. 22, 1936
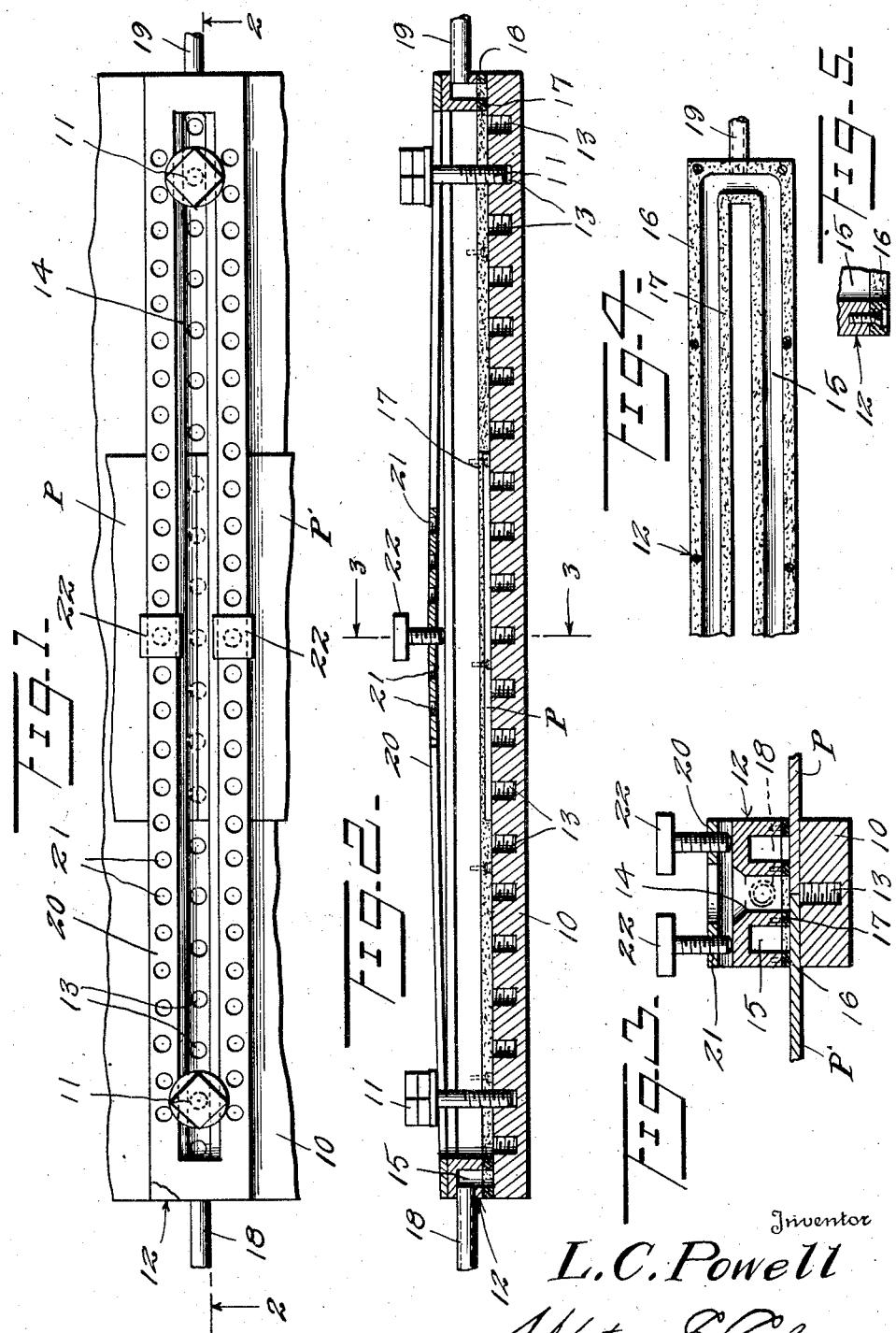
Inventor
L. C. Powell
By Watson E. Coleman
Attorney Patented Feb. 1, 1938

2,106,987

UNITED STATES PATENT OFFICE 2,106,987

DISTORTION CHECK FOR WELDING
APPARATUS

Laurence C. Powell, Portsmouth, Va.

Application December 22, 1936, Serial No. 117,239

4 Claims. (Cl. 113—98)

This invention relates to a distortion check for welding apparatus and is an improvement over the structure embodied in my Patent Number 2,076,207, granted April 6, 1937.

An object of this invention is to provide an improved clamping bar for use in clamping articles to be welded together on to a bed or support, with the clamping bar so constructed that not only the clamping bar but the article to be welded will be cooled at points outwardly from the point of welding to thereby prevent buckling or distortion of the article or articles which are being welded together.

Another object of this invention is to provide an improved clamping bar which is so constructed that it will not only prevent the articles which are being welded together from buckling but will also firmly maintain flat plates or the like on to a flat bed.

A further object of this invention is to provide an improved article clamping bar for use with welding apparatus which includes means engageable with the bar intermediate the ends thereof so as to hold the bar against longitudinal bending under the action of end clamps or bolts in order to snugly hold plates or the like on to a flat bed.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a view in plan of the work holding device constructed according to an embodiment of this invention.

Figure 2 is a vertical longitudinal section on the line 2—2 of Figure 1.

Figure 3 is a transverse section on the line 3—3 of Figure 2.

Figure 4 is a fragmentary bottom plan view of the clamping bar.

Figure 5 is a fragmentary sectional view of the clamping bar.

Referring to the drawing, the numeral 10 designates generally a bed which, in the present instance, is provided with a flat top and is also provided with a plurality of longitudinally spaced apart holes 13 to receive clamping bolts 11, which are adapted to engage through a clamping bar 12. The clamping bar 12 is adapted to engage on the upper or outer side of a pair of plates P and P' which are adapted to lie flat on top of the bed 10 with the abutting edges of the plates P and P' being disposed centrally of an elongated slot 14 which extends longitudinally of the clamping bar 12. The clamping bar 12 is provided on the under side thereof with a downwardly opening channel 15 and gaskets 16 and 17 engage against the under side of the clamping bar 12 on opposite sides of the channel 15 so that when the bar 12 is clamped on to the plates P and P', the gaskets 16 and 17 will seal the channel 15 and thus permit the passage of a cooling agent therethrough.

One end of the channel 15 is provided with an intake pipe or connection 18 and the other or outlet end has an outlet pipe 19 connected thereto so that a cooling medium in the form of water or the like may be circulated through the channel 15 and against the upper surfaces of the plates P and P'. The gaskets 16 and 17 are so constructed that where the clamping bar 12 projects beyond the outer edges of these two plates, the gaskets 16 and 17 will contact with the bed 10 and thus prevent any leakage of the cooling medium out of the channel 15.

The clamping bar 12 also has a second tensioning bar 20 mounted on the upper side thereof which is provided with a plurality of spaced apart holes 21 which are threaded and through which bolts 22 are adapted to engage. These bolts 22 are adapted to contact with the upper surface of the lower bar member 12 so that the intermediate portion of the upper or tensioning bar 20 may be bowed between the clamping bolts 11 and thus prevent longitudinal bending of the lower bar 12, particularly at the intermediate portion under the pressure of the clamping bolts 11.

In the use of this device, the two plates P and P' are placed on top of the bed 10 with the edges to be welded together in abutting relation and then the lower clamping bar 12 is placed over the plates P and P', with the abutting edges of the two plates disposed in the slot 14. The bolts 11 are then tightened so as not only to hold the plates P and P' firmly on the bed 10, but also to effect a sealing of the channel 15 above the plates P and P' and outwardly of the outer edges thereof. The bolts 22 may be turned so as to place the bar tensioning member 20 under tension and thus hold the lower bar 12 against longitudinal bending under the action of the clamping bolts 11. The cooling medium may then be circulated through the intake connection 18 and then out through the outlet connection 19 and the two plates P and P' welded together in the usual manner.

Through the use of a cooling means, as hereinbefore described, the articles which are to be welded together are not only prevented from buckling or bending but the clamping bar itself is maintained in a relatively cool condition. In the event the gaskets 16 and 17 will not flex sufficiently to adequately seal the channel 15 outwardly of the opposite edges of the plates P and P', additional gaskets may be inserted to fill up the space so that the cooling medium which is passed through the channel 15 will not leak out thereof.

It is, of course, understood that various changes and modifications may be made in the details of construction and design of the above specifically described embodiment of this invention without departing from the spirit thereof, such changes and modifications being restricted only by the scope of the following claims.

I claim:—

1. A distortion check as set forth, comprising a bed adapted to receive a pair of articles to be welded together, an article clamping bar provided with an elongated slot therein, means for clamping the bar on to the bed, a second slotted bar engaging the outer side of said first bar and engageable beneath the clamping means of said first bar adjacent the ends thereof, and threaded means carried by said second bar and engageable with the first bar intermediate the ends thereof to hold said first bar against longitudinal bending.

2. A distortion check as set forth, comprising a bed adapted to receive a pair of articles to be welded together, a clamping bar for holding said articles on to the bed, means for clamping said bar over said articles and on to the bed, said bar having an elongated slot extending longitudinally thereof and provided with a channel in the under side thereof on opposite sides of the slot and at each end thereof, said channel opening through the under side of said bar, means for circulating a cooling medium through said channel, and means engaging said bar on the outer side thereof to hold said bar against longitudinal bending.

3. A distortion check as set forth, comprising a bed adapted to receive a pair of articles to be welded together, an article clamping bar provided with an elongated slot therein, means for clamping the bar on to the bed, a second slotted bar engaging the outer side of said first bar and engageable beneath the clamping means of said first bar adjacent the ends thereof, and means carried by said second bar and engageable with the first bar intermediate the ends thereof to hold said first bar against longitudinal bending.

4. A distortion check as set forth, comprising a bed adapted to receive a pair of articles to be welded together, a clamping bar for holding said articles on to the bed, means for clamping said bar over said articles and on to the bed, said bar having an elongated slot extending longitudinally thereof and provided with a channel in the under side thereof on opposite sides of the slot and at each end thereof, said channel opening through the under side of said bar, means for circulating a cooling medium through said channel, and tensionable means engaging said bar intermediate the ends thereof and on the outer side to hold said bar against longitudinal bending.

LAURENCE C. POWELL.